(12) United States Patent
Schultz

(10) Patent No.: US 7,014,426 B2
(45) Date of Patent: Mar. 21, 2006

(54) BRAZED ALUMINUM TURBINE FOR AN AUTOMOTIVE TRANSMISSION AND METHOD THEREOF

(75) Inventor: John C. Schultz, Saline, MI (US)

(73) Assignee: General Motors Corporation, Detroit, MI (US)

( * ) Notice: Subject to any disclaimer, the term of this patent is extended or adjusted under 35 U.S.C. 154(b) by 30 days.

(21) Appl. No.: 10/367,202

(22) Filed: Feb. 14, 2003

(65) Prior Publication Data

US 2005/0074334 A1    Apr. 7, 2005

(51) Int. Cl.
*B63H 1/16*    (2006.01)

(52) U.S. Cl. .................. 416/180; 416/181; 60/330; 29/889.5

(58) Field of Classification Search ................ 416/180, 416/181; 60/330; 29/889.5
See application file for complete search history.

(56) References Cited

U.S. PATENT DOCUMENTS

| | | | | |
|---|---|---|---|---|
| 3,673,659 A | | 7/1972 | Ishii et al. ............ 29/156.8 CF |
| 3,708,846 A | | 1/1973 | Worner ................. 29/156.8 CF |
| 3,986,239 A | | 10/1976 | Worner ................. 29/156.8 CF |
| 4,152,816 A | * | 5/1979 | Ewing et al. ............. 29/889.2 |
| 4,257,741 A | | 3/1981 | Betts et al. .................. 416/190 |
| 4,521,160 A | | 6/1985 | Bouiller et al. ............. 416/218 |
| 4,703,884 A | * | 11/1987 | Landingham et al. ..... 228/124.5 |
| 4,705,463 A | | 11/1987 | Joco ........................... 417/407 |
| 4,944,660 A | | 7/1990 | Joco ........................... 417/407 |
| 5,282,362 A | * | 2/1994 | Renneker et al. ............. 60/345 |
| 5,331,811 A | * | 7/1994 | Giberson ....................... 60/330 |
| 5,465,575 A | * | 11/1995 | Shimmell ..................... 60/345 |
| 5,522,220 A | * | 6/1996 | Locker ......................... 60/361 |
| 5,706,656 A | * | 1/1998 | Hinkel .......................... 60/345 |
| 6,195,864 B1 | * | 3/2001 | Chesnes ..................... 29/402.01 |

OTHER PUBLICATIONS

*Metals Handbook, Ninth Edition*, vol. 6, "Welding, Brazing, and Soldering," pp. 1022-1032.

* cited by examiner

*Primary Examiner*—Hoang Nguyen
(74) *Attorney, Agent, or Firm*—Christopher DeVries

(57) ABSTRACT

The invention provides a high-strength stamped aluminum brazed turbine for use in an automotive transmission torque converter, and a method therefor. The method includes stamping aluminum inner and outer shells each having a plurality of slots, and stamping a plurality of aluminum turbine blades having tabs. The tabs of the turbine blades are inserted into the slots of the inner and outer shell, and the tabs are bent to attach the turbine blades to the inner and outer shell. The turbine blades are brazed to the inner and outer shell with a silicon material, thereby forming a turbine of sufficient strength to operate in the powerflow path of an automotive transmission using transmission oil as its working fluid.

10 Claims, 5 Drawing Sheets

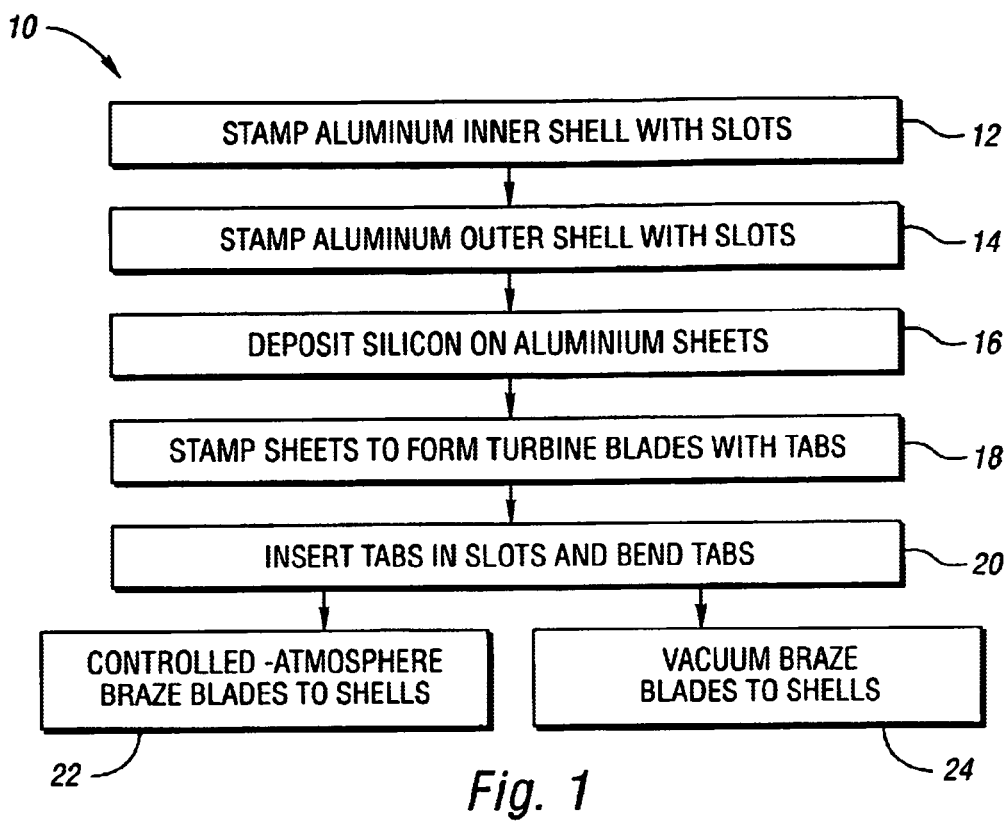
Fig. 1
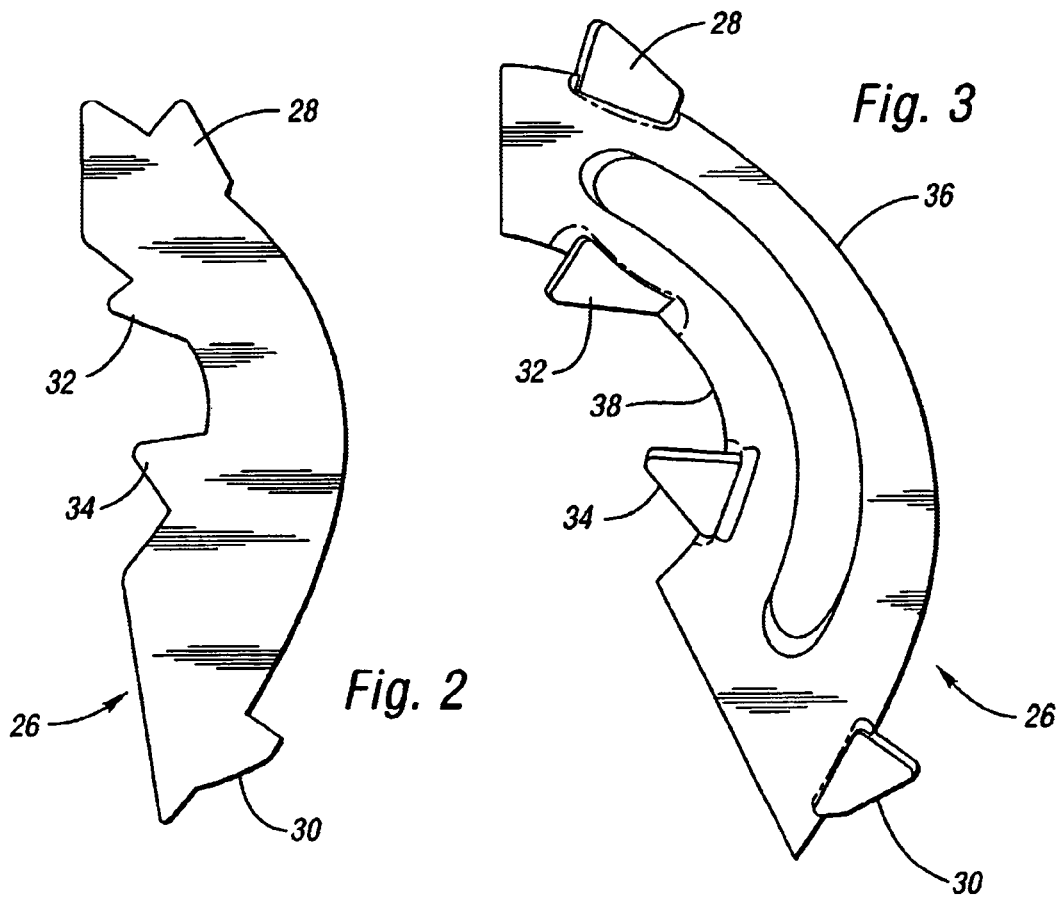
Fig. 2
Fig. 3

BRAZED ALUMINUM TURBINE FOR AN AUTOMOTIVE TRANSMISSION AND METHOD THEREOF

TECHNICAL FIELD

The present invention relates to a brazed, stamped aluminum turbine for an automotive torque converter.

BACKGROUND OF THE INVENTION

In a typical automatic transmission, a fluid coupling or torque converter is used to transfer power from the engine to the transmission. A typical torque converter includes an impeller linked to the crankshaft of the engine, and a turbine linked to the input shaft of the transmission. The impeller and turbine are mounted face-to-face within a common housing that is filled with transmission fluid. The impeller and turbine include a series of vanes or blades that rotate about a central axis. As the engine operates, the crankshaft rotates the impeller, thereby causing the fluid contained within the housing to circulate. The moving fluid strikes the blades of the turbine, which causes it to rotate. The rotating turbine imparts rotational movement to the input shaft of the transmission.

The torque converter differs from a fluid coupling in that it multiplies torque transmission. This is achieved by positioning a stator between the turbine and impeller to control the flow of returning fluid from the turbine. The stator includes a series of blades that redirect the fluid to strike the blades of the impeller at an angle that promotes rotation of the impeller. Accordingly, some of the energy of the moving fluid is returned to the impeller.

Because the turbine operates in the powerflow path of the vehicle drive terrain, it must have significant structural integrity to handle the torque requirements. Accordingly, torque converter turbines are typically manufactured from stamped steel to provide the needed strength.

SUMMARY OF THE INVENTION

The present invention provides a torque converter turbine which includes an inner shell, outer shell and turbine blades which are stamped aluminum components, and are brazed together with a silicon material to provide a lightweight, high-strength assembly.

More specifically, the invention provides a method of manufacturing a high-strength turbine for an automotive transmission torque converter, including the steps of: (A) stamping an aluminum inner shell with a plurality of slots; (B) stamping an aluminum outer shell with a plurality of slots; (C) stamping a plurality of aluminum turbine blades having tabs; (D) inserting the tabs of the turbine blades into the slots of the inner and outer shell; (E) bending the tabs to attach the turbine blades to the inner and outer shell; and (F) brazing the turbine blades to the inner and outer shell, thereby forming a turbine of sufficient strength to operate in the powerflow path of an automotive transmission using transmission oil as its working fluid.

Preferably, the brazing step comprises brazing in a controlled atmosphere furnace between approximately 1100° F. and 1200° F. using a silicon material which is pre-deposited on the turbine blades. Alternatively, the turbine blades may be brazed to the inner and outer shell by a vacuum brazing process.

Preferably, each blade includes only four tabs: two tabs for attachment to the inner shell and the other two tabs for attachment to the outer shell.

The invention also provides a high-strength turbine for an automotive transmission torque converter manufactured as described above to include a stamped aluminum inner shell with a plurality of slots, a stamped aluminum outer shell with a plurality of slots, and a plurality of turbine blades each having tabs extending through the slots of the inner and outer shell and bent over to attach the turbine blades to the inner and outer shell. The blades include a silicon material brazed to bond the turbine blades to the inner and outer shell.

The above objects, features, advantages and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 shows a schematic flow chart illustration of a method of manufacturing a torque converter in accordance with the invention.

FIG. 2 is a plan view of a flat turbine blade blank in accordance with the invention.

FIG. 3 is a plan view of a stamped turbine blade corresponding with the blank shown in FIG. 2.

DESCRIPTION OF THE PREFERRED EMBODIMENT

Figure 4:
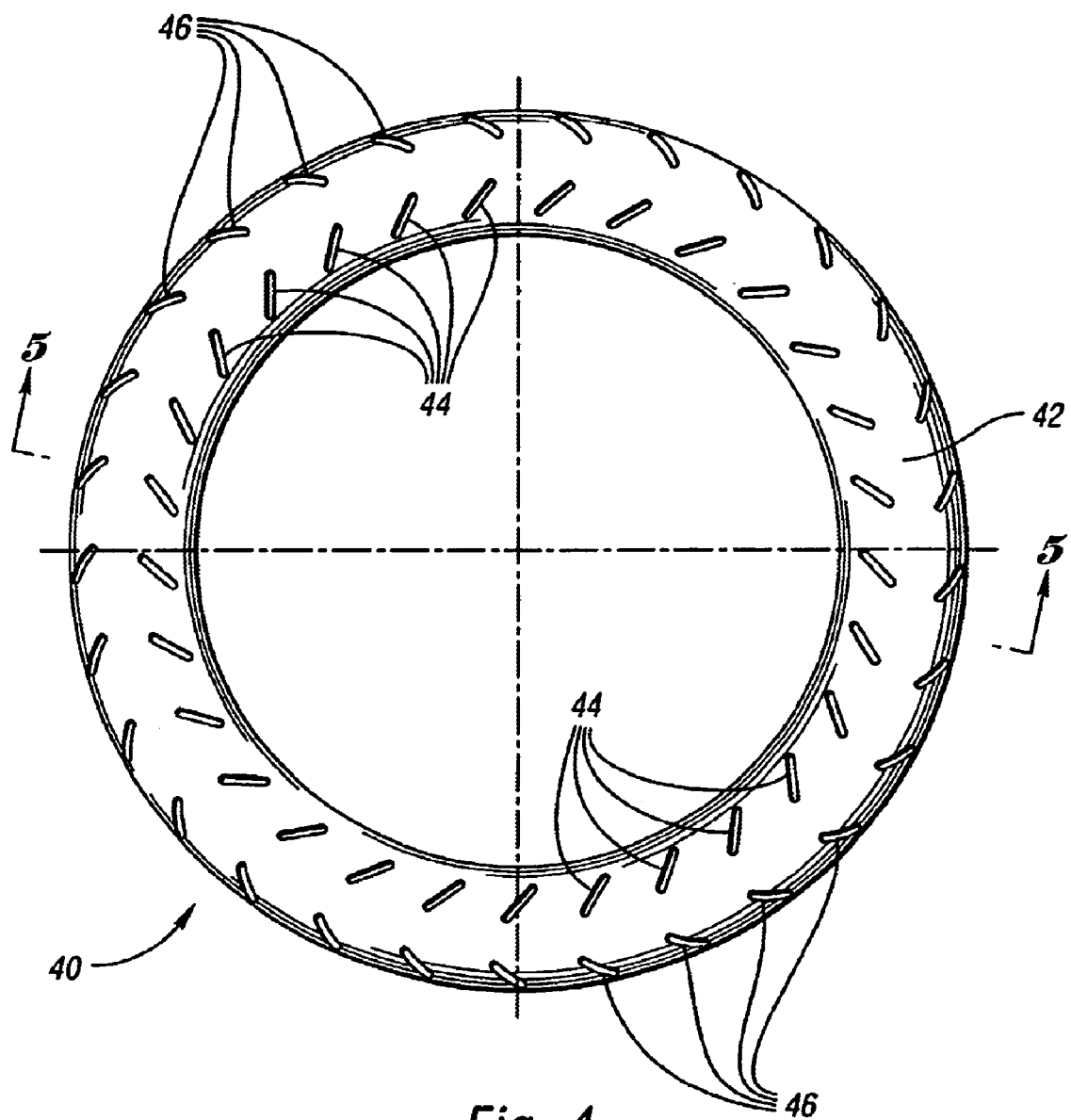
FIG. 4 is a plan view of a stamped turbine inner shell in accordance with the invention.

Referring to FIG. 1, a method 10 is schematically illustrated for manufacturing a high-strength turbine for an automotive transmission torque converter. The method will be described with reference to particular steps, which need not be performed in a particular sequence. As shown in FIG. 1, the first step (step 12) is to stamp an aluminum inner shell having slots therein. In the next step (step 14), an aluminum outer shell is stamped having slots therein. A silicon material is deposited on aluminum sheets (blanks) or formed in an aluminum-silicon alloy (step 16), and the sheets are stamped to form turbine blades with tabs thereon (step 18). Thereafter, the tabs of the turbine blades are inserted into the slots of the inner and outer shells, and the tabs are bent to secure the turbine blades to the inner and outer shell (step 20). A brazing process is then used to cause the silicon to bond with the aluminum of the inner and outer shell and turbine blades. The brazing process may be a controlled atmosphere brazing (step 22), or a vacuum brazing process (step 24). The preferred brazing method, controlled atmosphere brazing, will be described later.

FIGS. 2 and 3 illustrate an exemplary turbine blade for use with a turbine in accordance with the invention. As shown, the turbine blade 26 starts as a flat blank, shown in FIG. 2, which includes outer shell attachment tabs 28, 30 and inner shell attachment tabs 32, 34. FIG. 3 shows a plan view of the turbine blade 26 after stamping. As shown, the turbine blade 26 has an outer curved surface 36 configured to abut against the outer shell of the turbine, and an inner curved surface 38 configured to abut against the inner shell of the turbine. These surfaces 36, 38 may be pre-coated with an aluminum-silicon alloy so that the surfaces bond to the inner and outer shells during the brazing process, as described below. The tabs 28, 30, 32, 34 are configured to be inserted through the slots in the inner and outer shells, and thereafter bent to secure the turbine blades to the inner and outer shells. The turbine blade is preferably an SAE 0333 aluminum material or an SAE 3003 aluminum material.

Figure 5:
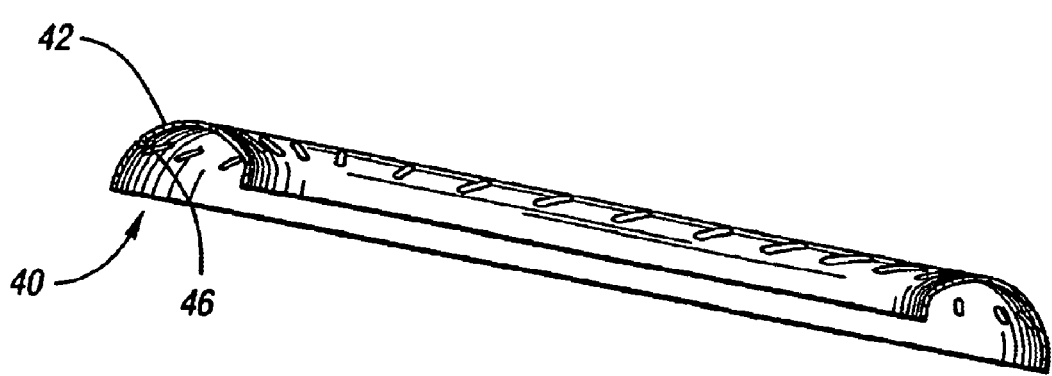
FIG. 5 is a sectional view taken at line 5—5 of FIG. 4.

FIGS. 4 and 5 illustrate a stamped inner shell 40 in plan view and sectional view, respectively. As shown, the stamped inner shell forms a half-doughnut shape configuration having an outer surface 42 configured to abut against the inner curved surface 38 of the turbine blades 26. As shown, the inner shell 40 includes inner and outer rows of slots 44, 46 formed therearound. The inner row of slots 44 are configured to receive the inner shell attachment tabs 34 of the turbine blades 26, and the outer row of slots 46 are configured to receive the inner shell attachment tabs 32 of the turbine blades 26. The inner shell 40 is preferably an SAE 3003 aluminum material.

Figure 6:
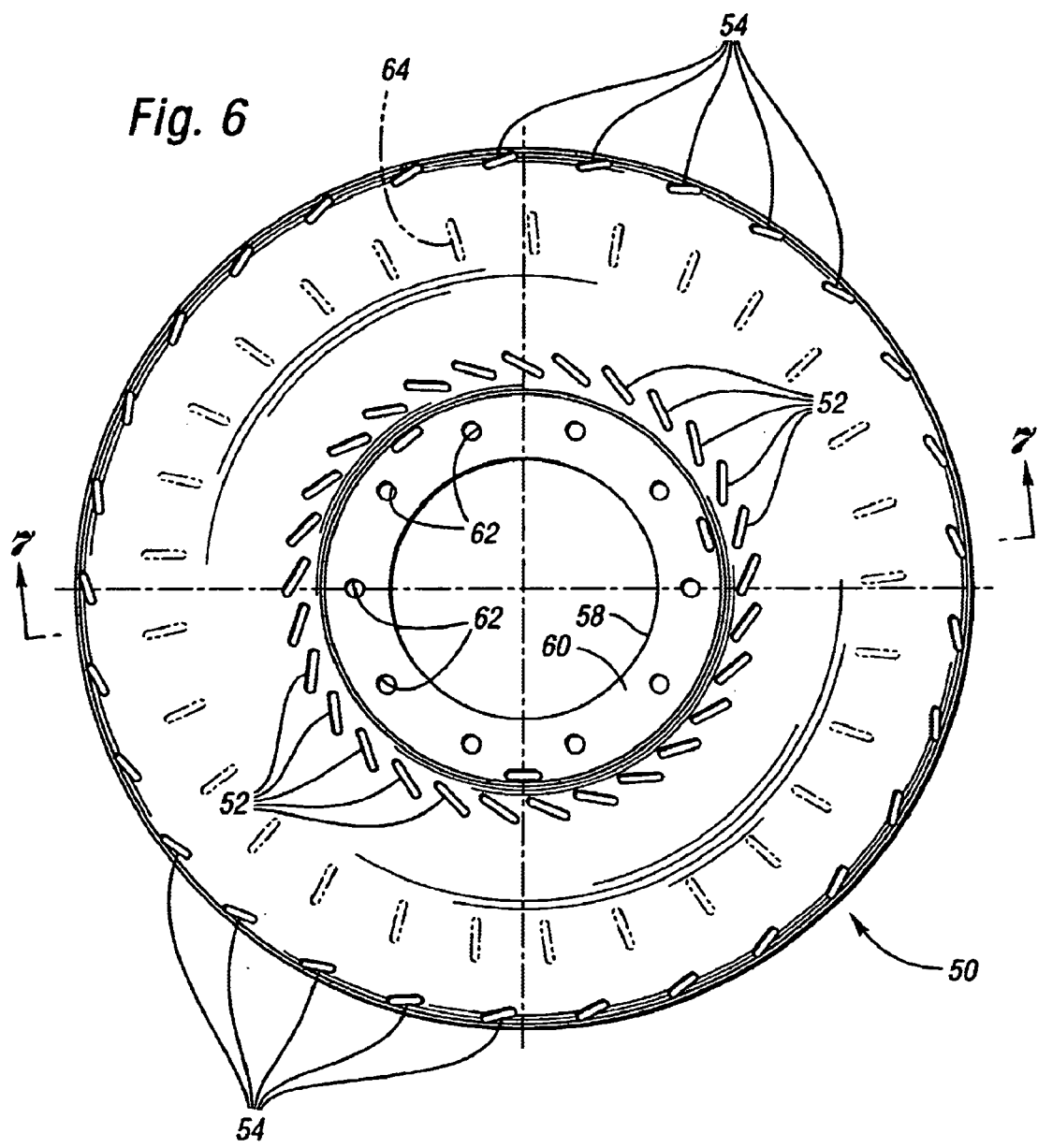
FIG. 6 is a plan view of a stamped aluminum outer shell for a torque converter in accordance with the invention.
Figure 7:
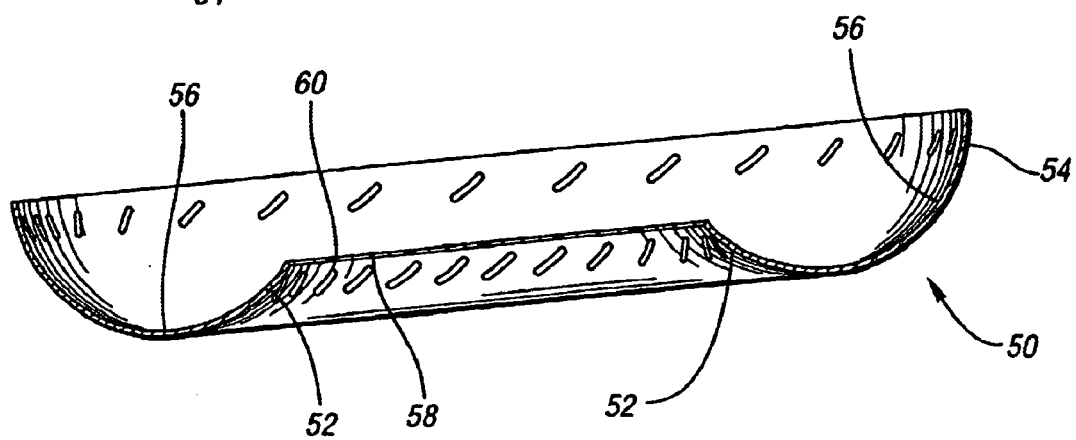
FIG. 7 is a sectional view taken from line 7—7 of FIG. 6.

FIGS. 6 and 7 show plan and sectional views, respectively, of the outer shell 50 of the turbine. As shown, the outer shell 50 includes inner and outer rows of slots 52, 54. The inner rows of slots 52 are configured to receive the outer shell attachment tabs 30 of the turbine blades 26, and the outer rows of slots 54 are configured to receive the outer shell attachment tabs 28 of the turbine blades 26. The outer shell 50 also includes an inner surface 56 which abuts the outer curved surface 36 of each turbine blade 26, and is bonded thereto by the brazing operation to be described below. The outer shell is preferably an SAE 6061 aluminum material.

As shown in FIGS. 6 and 7, the outer shell 50 also includes a central aperture 58 and a hub portion 60 with apertures 62 configured to receive rivets for attaching the turbine to the hub of a transmission input shaft.

As shown in phantom in FIG. 6, the outer shell 50 may also include a middle row of slots 64 to receive an additional tab on the turbine blades. This middle row of slots 64 and the additional tab of the turbine blades may not be necessary because of the substantial structural integrity provided by the brazing process.

After the tabs 28, 30, 32, 34 have been inserted through the slots 44, 46, 52, 54, the tabs are bent or tab-rolled.

Figure 8:
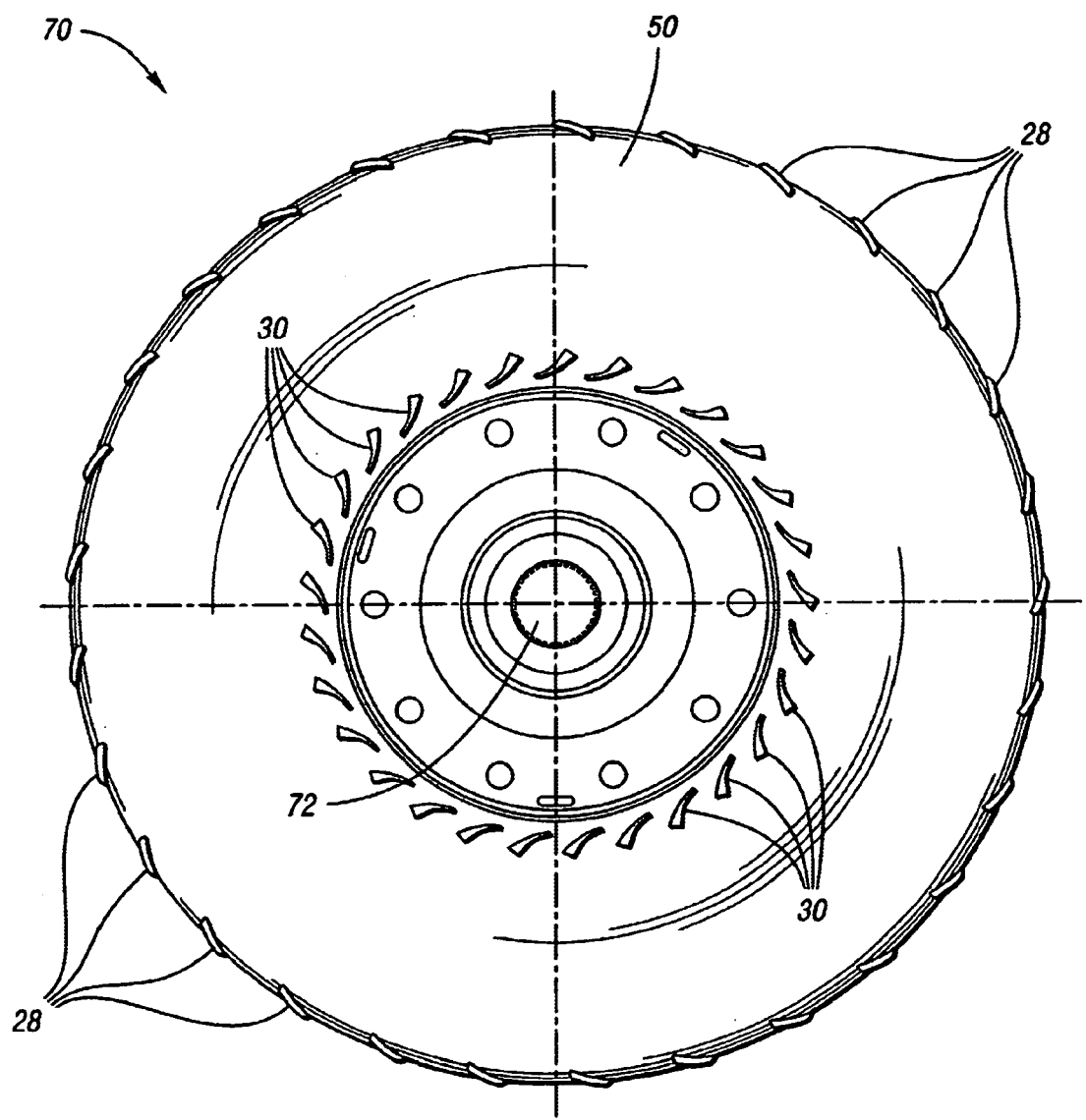
FIG. 8 is a plan view of an assembled, brazed turbine in accordance with the invention.
Figure 9:
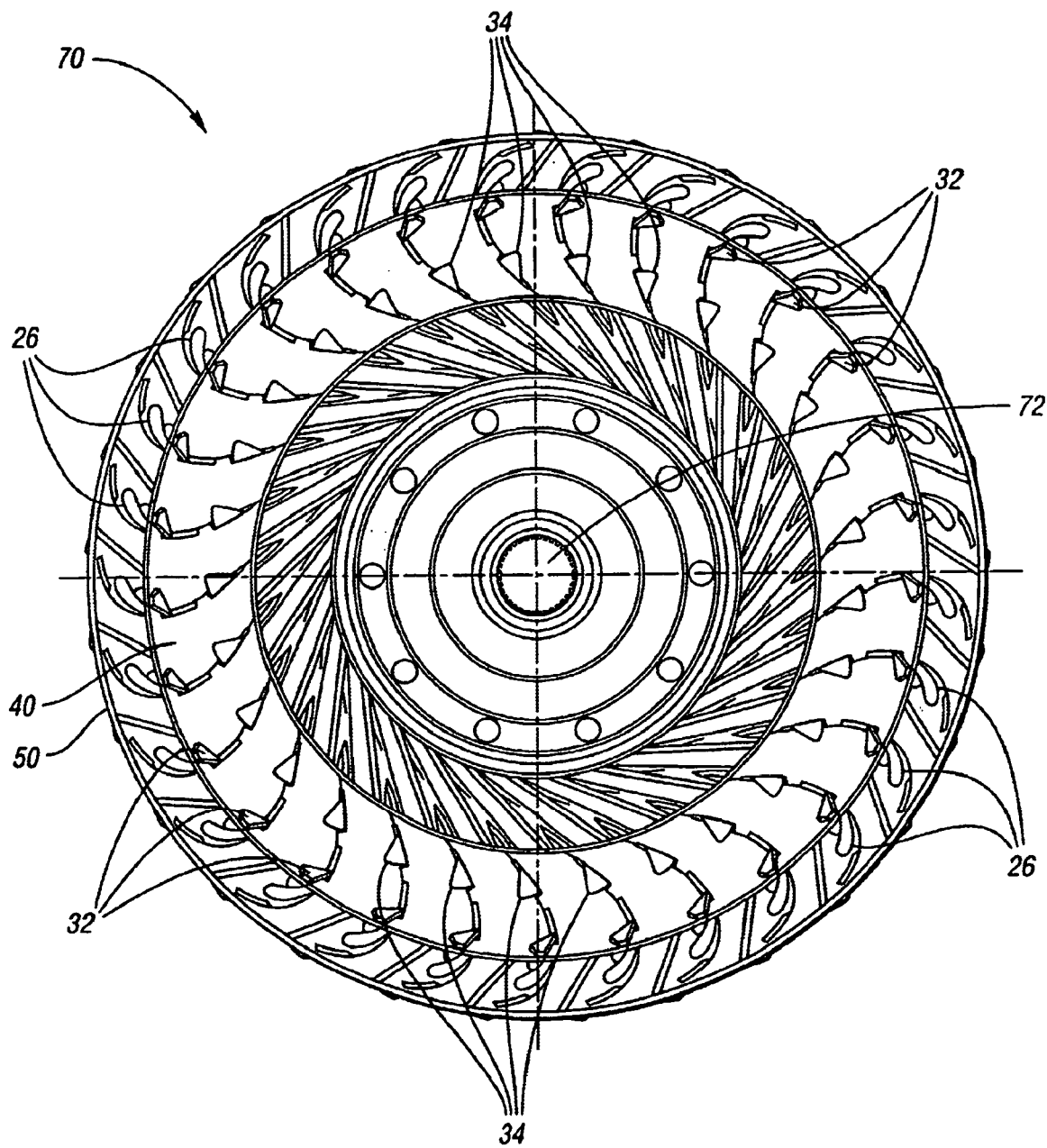
FIG. 9 is an opposite plan view of the assembled, brazed turbine of FIG. 8.

FIGS. 8 and 9 show transmission-side and engine-side plan views, respectively, of the final turbine assembly 70. In FIG. 8, the bent outer shell attachment tabs 28, 30 are visible, which attach the outer shell 50 to the turbine blades 26. In FIG. 9, the bent inner shell attachment tabs 32, 34 are visible which attach the inner shell 40 to the turbine blades 26. FIGS. 8 and 9 also show the hub 72 which is attached to the transmission input shaft.

Supporting disclosure related to the tab-and-slot assembly of a torque converter turbine, as well as the overall turbine structure, may be found in U.S. Pat. Nos. 5,282,362; 5,109,604; 5,113,654; 5,465,575, each of which is incorporated by reference in its entirety.

Once the tab-and-slot assembly of the turbine has been completed, the brazing process is initiated.

Preferably, the turbine blades are provided with a silicon layer clad on the surface of the blades. During furnace brazing, the silicon melts and is drawn by capillary action along the peripheral edges of the blade inner and outer curved surfaces 36,38. The silicon material is preferably provided in an aluminum-silicon alloy containing 7% to 12% silicon. By way of example, controlled atmosphere brazing and vacuum brazing processes are described in *The Metals Handbook, Ninth Edition*, American Society for Metals, 1983. As described therein, aluminum materials, such as 6061 and 3003 wrought alloys may be brazed between approximately 1100° F. and 1200° F. The silicon filler metals for brazing the aluminum are commercially available. Lower melting points may be obtained by adding copper and zinc. Filler metals for vacuum brazing of aluminum usually contain magnesium.

As described in the above mentioned *The Metals Handbook*, prior to the brazing operation, oil and grease must be removed from components of the turbine assembly to be brazed to eliminate stop-off effects. For non-heat-treatable alloys, vapor or solvent cleaning is usually adequate, although chemical cleaning may sometimes be required. For heat-treatable alloys, chemical cleaning is usually necessary to reduce the amount of tenacious oxide film. Chemicals used in cleaning prior to brazing include nitric acid, hydrofluoric acid, or nitric-hydrofluoric acid mixtures at room temperature. A widely used method is immersion for about 30 seconds in a solution containing equal parts of commercial nitric acid and water, followed by rinsing in clean water and drying in hot air.

Aluminum-silicon alloys require a special etchant, because the silicon constituent is not attacked readily by many alkaline or acid solutions.

For best results, brazing should be done within 48 hours after cleaning. If precautionary measures are taken to prevent their contamination, however, adequately clean components do not lose brazing qualities even in several weeks.

A furnace brazing process for brazing in an atmosphere furnace is described in detail in the above mentioned *Metals Handbook, Ninth Edition*, some of which is reproduced herein. Brazing in an atmosphere furnace is a high production process that requires minimum training and skill of operators. Production rates can be considerably higher and costs can be lower than that for torch brazing. The atmosphere furnace typically includes electrical heating elements and direct combustion and radiant tubes. Furnaces are generally refractory lined, although such linings become saturated with flux components. The temperature in the brazing zone must be uniform within +/-10° F. Circulation of atmosphere, preferably with baffles, is required to prevent local heat variations and to obtain the maximum rate of temperature rise.

Flux slurry may be applied to the turbine blades by dipping, brushing or spraying. Tap, distilled, or deionized water can serve as a vehicle; tap water should be free of heavy metals, because these can cause subsequent corrosion. Because hydrogen may be evolved when wet flux is heated on aluminum parts, closed assemblies must be vented. Gas generation can be reduced by drying the flux on the part prior to brazing. Mixing the flux with alcohol instead of water speeds the drying, but the fumes from the alcohol must be dissipated.

Ambient air or chemically inert gas is normally used as the furnace atmosphere. A dry atmosphere consisting of the products of combustion of fuel can sometimes reduce the amount of flux needed. For brazing aluminum to other metals, an inert, dry atmosphere is particularly beneficial.

Continuous furnace brazing requires furnaces divided into several progressive heating zones to improve heating rate and joint quality and to reduce warpage. A furnace cycle of 15 minutes or less is desirable. In automated operations, the brazing zone usually requires a travel time of two to three minutes for assemblies of moderate size.

Beyond the heating portion of the furnace, from 1 to 5 minutes of conveyor travel should be in an unheated zone to allow the filler metal to solidify. Directly following should be an air blast, hot water spray (180° F. to 212° F.), or a boiling water quench, which begins the flux removal process. For the heat-treatable alloys, a water quench after brazing permits improvement in the mechanical properties, especially if the parts are subsequently given an aging treatment.

This invention is the first recognition that aluminum stampings for turbine blades and shells can be furnace brazed to create a turbine assembly that has the strength and rigidity to survive the torque and duty cycle loading requirements inside the automotive hydrodynamic torque converter. This results in a product that has the lower manufacturing cost associated with the tab-and-slot construction and the lower mass of aluminum which may result in fuel economy savings and performance enhancements (such as quicker 0–60 mph times) due to reduced rotating inertia. The aluminum stamped turbine blades and inner and outer shells may be the same size and thickness as prior art steel assemblies.

It is desirable that the brazing fill any gaps between the blade tabs and slots, thereby potentially improving efficiency of the torque converter by preventing leakage into the interior of the turbine.

Vacuum brazing is an alternative to the above-described controlled atmosphere brazing process. Again, this process is described in *The Metals Handbook, Ninth Edition*, American Society for Metals, 1983, some of which is reproduced herein.

Vacuum brazing allows alloys of 1xxx, 3xxx, 5xxx, 6xxx, and 7xxx series to be brazed using number 7, 8, 13 or 14 brazing sheets, which are clad with 4004 filler metal. When additional filler metal is required, 4004 in wire and sheet form also can be introduced.

Cold wall vacuum furnaces with electrical resistance radiant heaters are recommended for aluminum vacuum brazing. Batch-type and semi-continuous furnaces are used. The vacuum pumping system should be capable of evacuating a conditioned chamber to a high vacuum (about $10^{-5}$ torr) made in five minutes. For most applications, rectangular chambers made of hot-rolled steel are suitable. The temperature distribution within the work being brazed should be reasonably uniform, ideally within +/−5° F.

Components are cleaned, usually by vapor degreasing with a common solvent such as perchlorethylene, assembled, and clamped in a suitable fixture made of stainless steel. Heating of the assembly is started simultaneously with pump down of batch type furnaces. Average time for heating to brazing temperature is about 15 minutes. The assembly is then held at brazing temperature for about 1 minute. If the chamber is back-filled with chemically inert gas, the assembly can be removed at temperatures above 900° F. Then, heat-treatable alloys can be quenched; non-heat-treatable alloys are air cooled. The clean, dry, brazed assembly is ready for use or further processing, as soon as it is cool.

Controlled atmosphere brazing is a less expensive process than vacuum brazing, and is therefore preferred. Corrosion is not a concern because the turbine assembly is always submerged in transmission fluid.

The mass savings realized in a sample 280 millimeter torque converter turbine was 2.4 pounds (compared to a steel turbine), and the reduction in dry turbine inertia was 55%. Further, the tab-and-slot construction results in some leakage from outside to inside the torus (working fluid) through small gaps where the tabs enter the slots. The brazing process may partially fill these gaps to prevent such leakage, thereby providing fuel economy improvement of 0.5–1%.

While the best mode for carrying out the invention has been described in detail, those familiar with the art to which this invention relates will recognize various alternative designs and embodiments for practicing the invention within the scope of the appended claims.

What is claimed is:

1. A method of manufacturing a high-strength turbine for an automotive transmission torque converter, comprising:
   stamping an aluminum inner shell with a plurality of slots;
   stamping an aluminum outer shell with a plurality of slots;
   stamping a plurality of aluminum turbine blades having tabs;
   inserting the tabs of the turbine blades into the slots of the inner and outer shell;
   bending the tabs to attach the turbine blades to the inner and outer shell; and
   furnace brazing the turbine blades to the inner and outer shell in one of a controlled atmosphere brazing process and a vacuum brazing process, thereby forming a turbine of sufficient strength to operate in the power flow path of an automotive transmission using transmission oil as its working fluid.

2. The method of claim 1, wherein said brazing comprises said controlled atmosphere brazing process.

3. The method of claim 1, wherein said brazing comprises brazing with a silicon material.

4. The method of claim 1, wherein said brazing comprises said vacuum brazing process.

5. The method of claim 1, wherein said brazing is performed between approximately 1100° and 1200° F.

6. The method of claim 3, wherein said silicon is deposited onto the blades before said brazing in an aluminum-silicon alloy.

7. The method of claim 1, wherein each said blade comprises only four tabs: two tabs for attachment to the inner shell and the other two tabs for attachment to the outer shell.

8. A method of manufacturing a high-strength turbine for an automotive transmission torque converter, comprising:
   stamping an aluminum inner shell with a plurality of slots;
   stamping an aluminum outer shell with a plurality of slots;
   stamping a plurality of aluminum turbine blades each having two tabs, and depositing a silicon material on the blades;
   inserting one of said two tabs of each blade into a slot on the inner shell and the other tab into a slot on the outer shell;
   bending the tabs to attach the turbine blades to the inner and outer shell; and
   brazing the turbine blades to the inner and outer shell in a controlled-atmosphere furnace between approximately 1100° and 1200° F., thereby forming a turbine of sufficient strength to operate in the power flow path of an automotive transmission using transmission oil as its working fluid.

9. A high-strength turbine for an automotive transmission torque converter, comprising:
- a stamped aluminum inner shell with a plurality of slots;
- a stamped aluminum outer shell with a plurality of slots;
- a plurality of turbine blades each having tabs extending through the slots of the inner and outer shell, and bent over to attach the turbine blades to the inner and outer shell; and
- said blades including a silicon material furnace brazed to bond the turbine blades to the inner and outer shell.

10. The high-strength turbine of claim 9, wherein each said blade comprises only four tabs: two tabs for attachment to the inner shell and the other two tabs for attachment to the outer shell.

* * * * *